United States Patent [19]

Cearley et al.

[11] Patent Number: 4,956,777

[45] Date of Patent: Sep. 11, 1990

[54] AUTOMATIC VEHICLE CONTROL SYSTEM

[75] Inventors: Thomas W. Cearley, Clemmons; Michael F. Donovan, Advance; Raymond A. Gardea, II, Winston-Salem; Kolleen C. Hughes, King; William R. Hunt, III, Mt. Airy; William R. Jarvis; Marvin R. Martin, both of Winston-Salem, all of N.C.; Aftab Shamb, Clay, N.Y.; Michael D. Shepard, Winston-Salem, N.C.; William F. Summers, Mocksville, N.C.; David C. Twine, Winston-Salem, N.C.; Lonnie M. Utt, Jr., Mt. Airy, N.C.

[73] Assignee: R. J. Reynolds Tobacco Company, Winston-Salem, N.C.

[21] Appl. No.: 204,336

[22] Filed: Jun. 9, 1988

[51] Int. Cl.$^5$ .............................................. C06F 15/50
[52] U.S. Cl. ............................... 364/424.02; 180/168; 180/169
[58] Field of Search .................... 364/424.01, 424.02, 364/513; 180/167, 168, 169; 371/9.1

[56] References Cited

U.S. PATENT DOCUMENTS

| 4,284,160 | 8/1981 | DeLiban et al. | 180/168 |
| 4,361,202 | 11/1982 | Minovitch | 364/424.02 |
| 4,630,216 | 12/1986 | Tyler et al. | 180/168 |
| 4,780,817 | 10/1988 | Lofgren | 180/168 |
| 4,791,570 | 12/1988 | Sherman et al. | 364/424.02 |

OTHER PUBLICATIONS

"A Distributed System for Digital Signal Processing and Computation for Automated Vehicle Guidance", by Goddard et al., IEEC & E, Oct. 1981.

Primary Examiner—Gary Chin
Attorney, Agent, or Firm—Grover M. Myers

[57] ABSTRACT

The system includes a first computer for communicating with automatic guided vehicles on a guided vehicle loop and storing information related to vehicle position. A second computer determines vehicle destinations. The first computer and the second computer maintain separate databases. Information in the data of the first computer relating to vehicle position is copied into the database of the second computer to assist in making vehicle destination determinations and the vehicle destination information stored in the database of the second computer is copied into the first computer. The invention also includes a unique fast and slow polling routine to insure that data transfer to the vehicles requiring it most is achieved in any polling cycle.

19 Claims, 4 Drawing Sheets

AUTOMATIC VEHICLE CONTROL SYSTEM

BACKGROUND OF THE INVENTION

1. Field of the Invention

This invention relates to improvements in control systems for automatic guided vehicles of the type having vehicle controllers on board the vehicles, traffic controllers remote from the vehicles for transmitting control information to the vehicles, and administration controllers for processing vehicle movement requests and transmitting the processed requests to the traffic controller.

2. Discussion of Related Art

Automatically controlled vehicles are becoming more common in applications such as warehousing facilities for storing and retrieving goods, manufacturing facilities for supplying raw goods to processing stations and removing finished goods from processing stations, and facilities for moving passengers from point to point. Such systems can become quite complex and require a high sophistication in control technique in order to most efficiently use available computer resources. To date, there have been many types of control systems suggested for automatic guided vehicles.

U.S. Pat. No. 4,015,804 shows one example of a control for guided vehicles having a system management center which receives control commands and line assignments of vehicles taken into and out of service. The system management center sends directions to a vehicle control center. These directions include instructions as to vehicle number, switch direction, destination, optimum speed, coupling commands, etc. These instruction are then communicated to the vehicles through a vehicle control center which receives information back from each vehicle regarding its status, position, velocity, etc.

U.S. Pat. No. 4,333,147 shows a multiplex automated guidance system for controlling moving vehicles along a plurality of partially coincident travel paths defined by an equal number of guideway conductors.

U.S. Pat. No. 4,530,056 discloses an automated guided vehicle system in which vehicles follow a guide path defined by wires carrying electrical signals with selective routing between stations along the path.

U.S. Pat. No. 4,278,142 discloses a system for the automatic guidance of a vehicle along a scheduled road route, which comprises marks of varying shapes possessing respectively specific travel function information and attached to the surface of the roads selected for the vehicle's travel.

U.S. Pat. No. 4,630,126 discloses a computer control conveying system provided for use in transporting materials between locations.

A conventional automated guided system is sold by Portec Inc., Automated Systems Division, 4500 Western Avenue, Lisle Illinois. This system is sold under the designation "Portec Navigator" and includes a plurality of guided vehicles each of which has an on board vehicle controller which includes a microprocessor, a timer, a speed controller, an input/output subsystem, and a full duplex on-board data transmitter. The vehicle controllers communicate with a traffic controller which communicates task assignments and blocking instructions to vehicles, optimizes task assignments, usually on a first in/first out basis, interfaces with ancillary input/out systems of a load sensor and remote terminals, and controls accessory equipment such as doors, elevators and safety devices. The traffic controller is based around a minicomputer and runs on software programs based on standard modules. The traffic controller interfaces with the administration controller which incorporates diagnostic and data reporting programs and performs other types of functions.

SUMMARY OF THE INVENTION

One object of the present invention is to provide an improved control for automated guided vehicles whereby there is great flexibility in the number of controlled vehicles.

Another object of the present invention is to provide a system in which conventional computer hardware and software can be used to control a large number of guided vehicles.

A further object of the present invention is to provide a system in which all of the guided vehicles can be easily and quickly polled to determine their present location and to provide updated control information.

Another object of the present invention is to provide a system in which a priority is established with regard to polling of and data transmission to vehicles so that control data required by vehicles to ensure efficient operation of the system is received in a timely manner.

In accordance with the above and other objects, the present invention comprises a system including a plurality of guided vehicles operating along a guided vehicle path. A plurality of indicators is positioned along the path for indicating to the vehicles their position on the path. A guided vehicle controller is provided and includes a communication system for communicating with the guided vehicles. A first computer system exchanges information with the guided vehicles through the communication system and includes a first memory section for storing information received from the vehicles including position data of each vehicle in relation to the indicators. A second memory section is included for storing information to be transmitted to the vehicles including vehicle destinations or vehicle destination information. A second computer system provided is for receiving vehicle movement requests from external sources and determining which vehicles are to respond to the requests. The second computer system includes a third memory section for storing information relating to vehicle positions, i.e. vehicle position data in relation to the position indicators. A fourth memory section is provided for storing information including vehicle destination information. A first transfer system copies the information in the first memory section to the third memory section so that the first and third memory sections contain the same vehicle position information and a second transfer systems copies the information in the fourth memory section to the second memory section so that the fourth and second memory sections contain the same vehicle destination information.

The first computer system polls the vehicles using a fast polling routine for vehicles within a first predetermined distance of a next position indicator and using a slow polling routine after the fast polling routine is completed. The fast polling routine includes requesting information from each vehicle as to its position, storing the requested fast poll position information and indicating to each fast polled vehicle whether it should stop or continue. The slow polling routine comprises sending new destination information to each vehicle requiring a new destination and requesting of vehicles not polled during the fast polling routine information relating to vehicle position, storing the requested slow poll position information and indicating to slow polled vehicles whether they should stop or continue. Also, during the slow polling routine, error information is requested.

The fast polling routine may be done at predetermined time intervals and the slow polling routine is begun only after the fast polling routine is completed. The first computer system establishes a polling cycle including a predetermined time limit, and terminates the slow polling routine when the time limit has expired. The fast polling routine is completed in each cycle regardless of the time limit. Information relating to the termination of a slow polling routine is stored and the slow polling routine is continued when the a next cycle of the fast polling routine is completed.

BRIEF DESCRIPTION OF THE DRAWINGS

The foregoing and other objects of the present invention will become more readily apparent as the invention is more completely understood from the detailed description to follow, reference being had to the accompanying drawings in which like reference numerals represent like parts throughout, and in which.

DETAILED DESCRIPTION OF THE PREFERRED EMBODIMENTS

Figure 1:
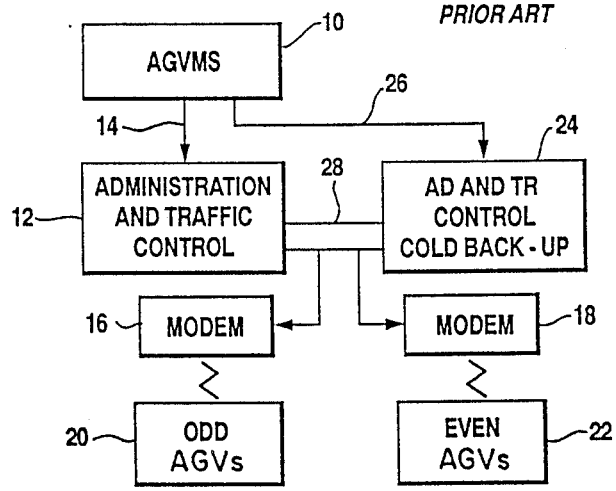
FIG. 1 is a block diagram showing a prior art vehicle controller construction.

FIG. 1 shows a typical prior art vehicle controller configuration for an automated guide vehicle system. In FIG. an automated guided vehicle management system 10 manages information flow between various stations of a manufacturing facility relating to the movement of raw materials, waste, rejects and/or finished goods by automated guided vehicles. The vehicle management system 10 may serve many functions within the plant and may operate as a host computer for an administration and traffic control computer system 12. The vehicle management system 10 will transmit to the administration and traffic control, system 12 specific vehicle movement requests asking that certain materials be transported by guided vehicle to a specific location or that certain finished goods be removed from a particular location and transported to a certain destination. The flow of commands from the management system 10 to the administration and control system 12 is indicated at 14. These commands are general in nature indicating only that particular materials are to be picked up at one location and dropped off at another location. The administration and traffic control system 12 determines which vehicles are available for particular jobs, maintains status information on each vehicle and actually controls the movements of various vehicles through modems 16 and 18. Communication with the odd numbered automated guided vehicles (AGVs) 20 is carried out through modem 16 whereas commands to and data from the even numbered AGVs 22 are channeled through modem 18.

The system of FIG. includes a cold backup administration and traffic control system 24. Administration and traffic control system 12 can be, for example, one computer such as a Digital Equipment Corporation PDP 11 mini computer 11. The backup system 24 could be a similar computer carrying the same programming. In the event of a break down in the system 12, commands from the management system 10 are transmitted through lines 26 to the backup system 24 and a manual switch 28 is thrown to permit the backup system 24 to communicate with the AGVs 20, 22 through modems 16 and 18.

It will be understood that the administration and traffic control system 12 performs various administration functions as well as various traffic control functions. The administration functions include software routines for coordinating the system's operation with the management system computers 10, receiving data from the management system and/or from i/o systems sensors and terminals indicating vehicle movement requests communicating movement requests and task assignments to the traffic controller software, recording operational data, and generating management reports, start up and shut down and restarts of the systems. In other words, the administration controller software gathers all pertinent information about material requirements and movements. It then directs the traffic controller software to assign routes and to dispatch vehicles accordingly. If desired, optional software for selecting an optimum route based on distance and time dependent factors such as number of turns, projected number of stops and speed, can be provided within the traffic controller.

The traffic control routines of system 12 are responsible for communicating task assignments and blocking instructions to the AGVs 20-22. Blocking instructions have to do with telling the vehicle whether it is to continue or to stop in place awaiting further instructions, as will be discussed in further detail below. The traffic control software also optimizes task assignments, may monitor accessory equipment such as doors, elevators and safety devices, and may control battery chargers.

Furthermore, a vehicle controller subsystem is provided on each automatic guided vehicle 20-22 and is linked to the traffic controller through an on board, full duplex data transmitter. This link enables each vehicle to maintain real time constant communication with the traffic controller software through modems 16 and 18. The vehicle controller also controls the vehicle speed and acceleration, monitors safety subsystems, controls steering and route optimization, operates load transfer equipment, monitors vehicle operations and systems, and aids in vehicle testing and diagnosis.

Figure 2:
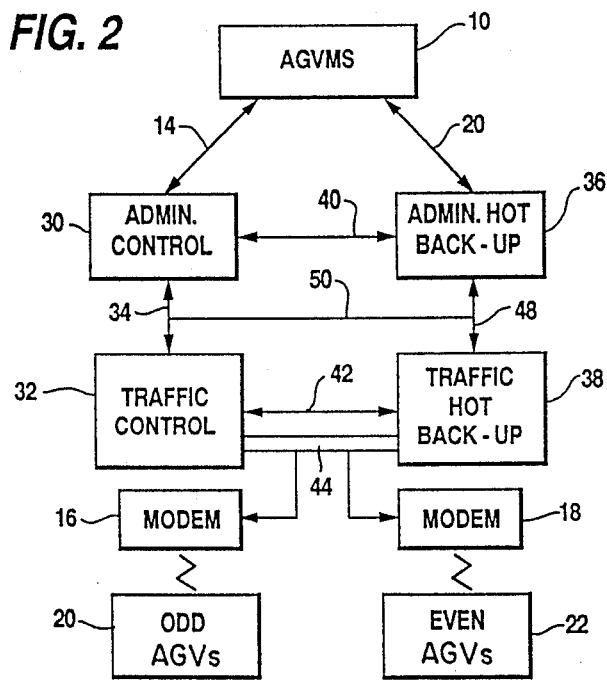
FIG. 2 is a block diagram showing the layout of the computer systems in the vehicle controller configuration of the present invention.

FIG. 2 shows the improved control system of the present invention which includes the same automated guided vehicle management system 10 which provides control instructions on lines 14 and 20. However, administration control and traffic control functions of the present invention are broken up into separate subsystems and are run on a separate computers 30, 32 which communicate through data lines 34. The administration control computer 30 may be, for example, a Digital Equipment Corporation PDP 11/84 minicomputer and the traffic control computer 32 may be a pDp 11/83 minicomputer. The functions of the traffic control computer 32 are limited essentially to communicating with the odd numbered AGVs 20 through modem 16 and to the even numbered AGVs 22 through modem 18. Basically, the same software routines are run on computers 30 and 32 as on the prior art computer system 12 but the software is broken up and run on two computers to provide greater flexibility in vehicle control and the ability to control a greater number of vehicles.

In addition to the administration control computer 30 and traffic control 32, hot backup computers 36 and 38 are provided. Computer 36 may also be a PDP 11/84 and computer 38 may be a PDP 11/83. Administration control computer 30 communicates with the hot backup computer 36 through control lines 40 so as to automatically inform the hot backup computer 36 of an error requiring backup computer 36 to take over the administration control functions. Similarly, computers 32 and 38 communicate through a line 42 so that computer 38 can take over the traffic control functions when an error occurs in the traffic control computer 32. The link between the traffic control computer 32 and the hot backup computer 38 to modems 16 and 18 is through a peripheral switch link 44 which includes an arbiter board that automatically connects traffic controller 32 to the modems if no error occurs but connects the backup computer 38 to the modems 16 and 18 in event of an error.

The operation of hot backup computers and peripheral and switch links is well known so that the details of these features will not be discussed here. What is important to understand, however, is that each computer 30, 32, 36 and 38 has it own memory and that certain data must be duplicated in each of the memories as required for the administration control and traffic control software to be executed. For this reason, there is a data communication link between all of the computers as shown in FIG. 2. Link 34 connects administration control computer 30 with traffic control 32, similarly a data link 48 connects computers 36 and 38 and a data link 50 connects the memories of the active computers 30, 32 to the backup computers 36 and 38.

Figure 3:
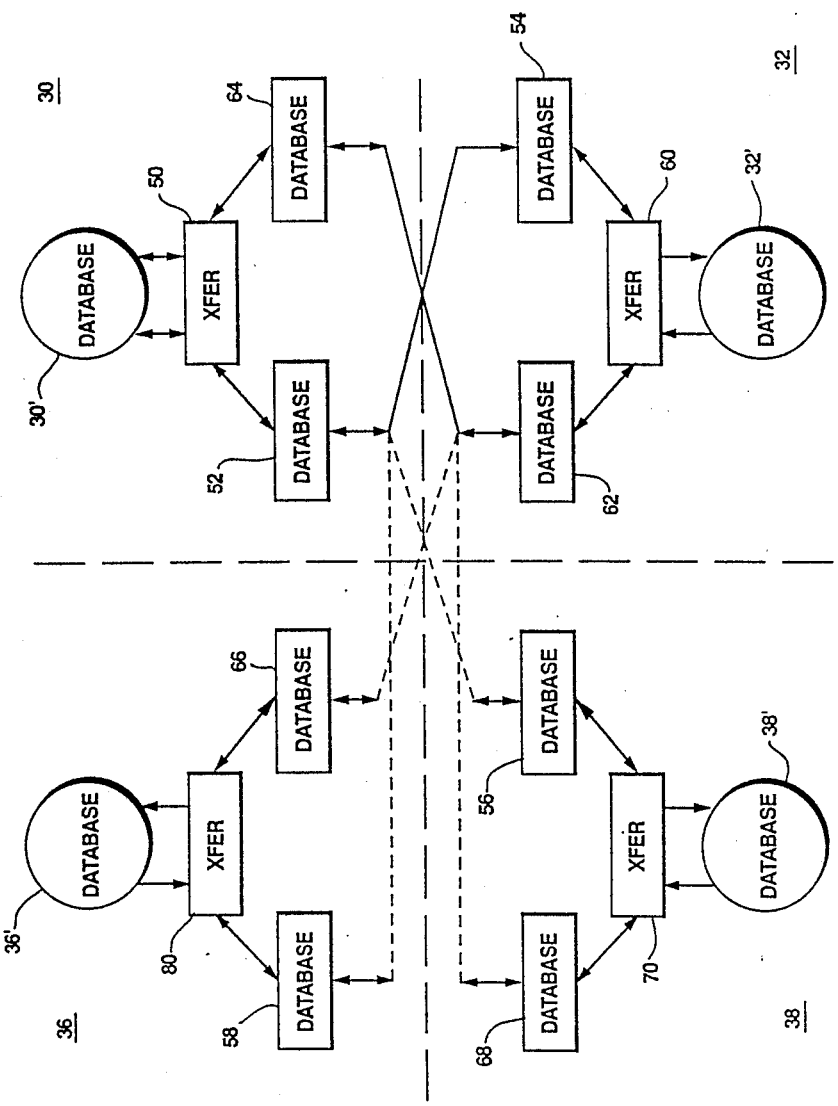
FIG. 3 is a flow diagram showing the flow of data during the data transfer taking place in the controller of FIG. 2.

FIG. 3 shows more clearly the data transfer which takes place in the system of the present invention. In FIG. 3, it is assumed that computers 30 and 32 are active and computers 36 and 38 act as hot backups. It will be understood, of course, that either computer 30 or 36 can be designated as the active computer with the other being a backup. Likewise either the computer 32 or computer 38 can be designated active with the other being designated backup. In each case, the active and backup computers run exactly the same software and continuously operate so that a transfer between active and backup computers can take place at any time without any information being lost or any control system down time being necessary.

As shown in FIG. 3, computer 30 includes a database 30' which contains all of the information necessary for the administration routines to be run, as well as data generated as output by the administration control programs. Similarly, computer 36 includes a database 36,, computer 32 contains a database 32' and computer 38 contains database 38' In each case, the database is active RAM memory within the computer.

Periodically, the data in the database of an active computer is transferred to other databases requiring similar information. In the case of computer 30, the database 30' will contain the following data elements including vehicle destination information which must be copied out:

| ELEMENT NAME | SIZE | USE |
| --- | --- | --- |
| Destination | 2 bytes | one entry for each vehicle to indicate vehicle destination |
| Type | 1 byte | one entry for each vehicle to indicate what type of jobs the vehicle is eligible for |
| Status | 1 byte | one entry for each vehicle to indicate vehicle status |
| Zone | 200 bytes | indicates whether guide path zones are on or off |
| I/O Status | 72 bytes | indicates status of all field I/O (photo-eyes limit switches, etc.) |

The data above including vehicle destination information in database 30' must be transferred to data base 32' to database 36' and to database 38'. This is accomplished by a transfer routine 50 which may be written in Fortran or any other convenient language. This is a conventional type of routine which simply copies each desired data element into an intermediate database 52. Database 52 is a temporary database which is written in accordance with the language CRISP. CRISP is a software system sold by CRISP Automation, a division of Joy Technology, and includes a networking capability referred to as CRISPNET. It will be understood that other types of networks could be used equally as well for transferring the data. Database 52 is a CRISP database stored in RAM. The transfer program 50 insures that database 52 contains all of the data to be transferred from database 30 to the other databases. Through the CRISPNET link, the data from database 52 is transferred to a CRISP database 54, to a CI:ISP data base 56 and to a CRISP database 58 using a token ring system. The data in database 54 is transferred to database 32' of computer 32 using a second transfer program 60 which is identical to transfer program 50. Transfer program 60 is run on computer 32 to complete the data transfer in this area. Similarly, a transfer program 70 run on computer 38 transfers the data from database 56 into database 38'. Finally, a transfer program 80 transfers the data in database 58 to database 36'. In this manner, all of the data is transferred to the memory of each computer requiring it so that duplicates of the data are contained in every computer. This allows the computers 30 and 32 to operate on the same data so that the two computers essentially function as one.

Database 32', which is assumed here to be the database of the active computer, contains including vehicle position information which is received from the AGVs and must be transferred to database 30' in order for the administration functions to be carried out. This data includes:

| ELEMENT NAME | SIZE | USE |
| --- | --- | --- |
| Loaded | 1 byte | one entry for each vehicle to determine if the vehicle has a load of any type on board |
| Status | 1 byte | one entry for each vehicle to indicate |

| ELEMENT NAME | SIZE | USE |
|---|---|---|
| | | vehicle's current travel status |
| Lowbat | 1 byte | one entry for each vehicle - true if vehicle has a low battery |
| RPT | 1 byte | one entry for each vehicle to indicate vehicle's previous status |
| Vehers (5) | 5 bytes | one entry for each vehicle to store vehicles last five error codes reported |
| Currmp | 2 bytes | one entry for each vehicle to determine vehicle's current path indicator location |
| Nextmp | 2 bytes | one entry for each vehicle to indicate vehicle's next expected indicator location |
| Destination | 2 bytes | one entry for each vehicle to indicate vehicle's final destination |
| Mintravel | 2 bytes | vehicle's expected travel time to next indicator location |
| Intdest | 2 bytes | one entry for each vehicle to indicate vehicle's destination |
| Nextdest | 2 bytes | one entry for each vehicle to indicate vehicle's next destination after the current destination is reached |
| Blocker | 2 bytes | one entry for each vehicle to indicate reason for vehicle being blocked (if blocked) |
| Blockt | 3500 | Blocking table indicating status of each path indicator location (blocked by a vehicle or I/O or clear) |

The above data is stored in active database 32' and transferred out by transfer program 60 to CRISP database 62'. From the CRISP database 62, the CRISPNET link is used to transfer the data to CRISP database 64 and then to database 30' using transfer program 50. Similarly, the data in database 62 is transferred to database 66 and then to database 36' using transfer program 80. Likewise, the data is transferred to database 68 and then to database 38 through data transfer program 70.

The data transfers are initiated at one second intervals. This provides a constant updating of the data in all of the databases so that the same data is available wherever it is needed. This allows the computers to function as a single system using a single database but with more flexibility and with the ability to control a greater number of vehicles.

It will be noted that according to the present data transfer scheme, the data in active database 30' is transferred to inactive database 36'. Inactive computer 36 receives all the same inputs as active computer 30 and could generate its own database. However, it has been found preferable to simply transfer the data through data transfer calls to insure that the data in database 36' is a duplicate of the data in database 30'

It is also noted that the data transfer paths from active computer to active computer are shown in solid line whereas the data transfer paths from an active computer to a backup computer are shown in dotted lines. Similar data transfer paths are established regardless of which computers are active and which computers act as backup computers.

Figure 4:
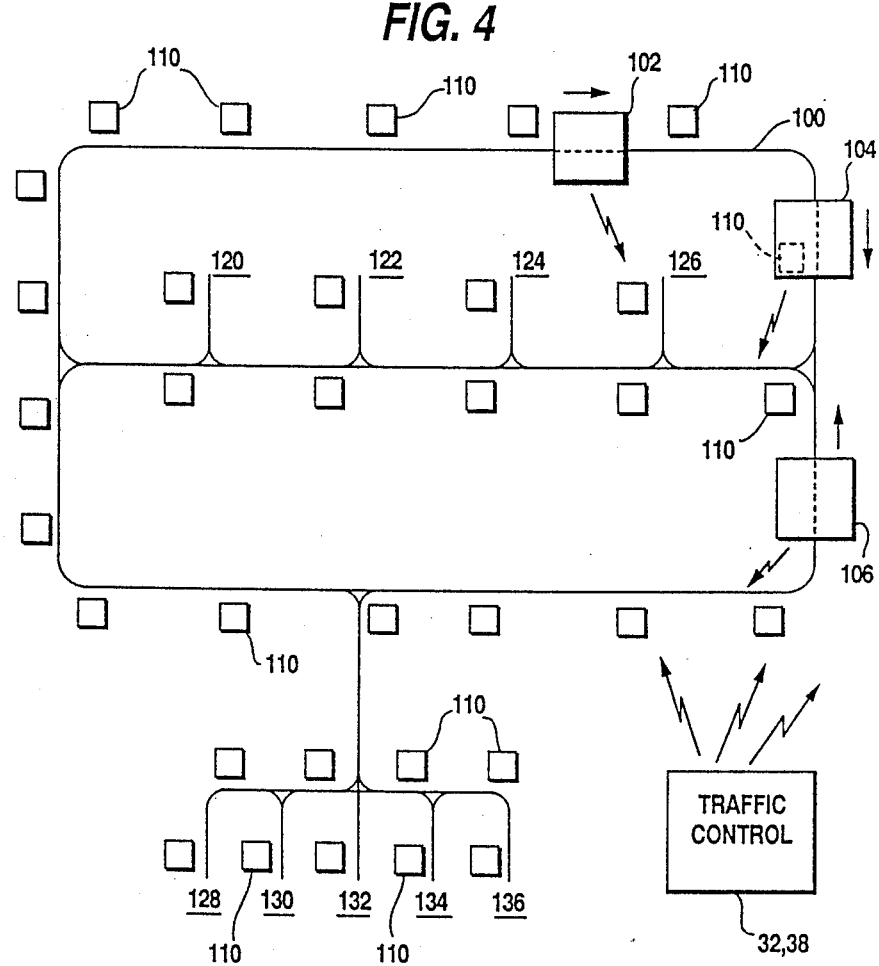
FIG. 4 is a diagram showing the relative movement of several automated guided vehicles on a typical guided vehicle path.

Most of the data including vehicle position information transferred from database 32' to database 30' is obtained from the vehicles themselves. Much of this data relates to the position of the vehicles in relation to the indicators as shown in FIG. 4. FIG. 4 shows a vehicle guide loop 100 on which various vehicles 102, 104 and 106 are guided. This is a standard type of guide loop having a signal emitted therefrom which is received by the vehicles to guide them along the proper path. The loop 100 is in the form of a conductor imbedded in the floor of a manufacturing facility or the like. Also embedded in the floor are a plurality of position indicator transducers (PITs) 110 which are passive elements that can be interrogated by the vehicles to determine vehicle position on the loop 100. Each PIT is assigned an individual number which can be read by the each AGV so that each AGV can determine its position relative to the PITs.

The loop 100 extends into various position locations 120, 122, 124, 126, 128, 130, 132, 134, 136, etc., for example, which may be vehicle destinations. Each vehicle maintains in memory a map of the facility which provides an optimum path to be taken from one destination to another. This same map is duplicated in the administration controller. New destination information is transmitted by the traffic control computer 32 or 38 and the vehicles transmit position data indicating the last PIT 110 which has been passed and the PIT 110 which the vehicle is approaching, as will be discussed in greater detail below. As discussed above, the PITs have unique designations such as numbers assigned to them which are used to uniquely identify the positions of the vehicles.

Inasmuch as vehicles may interfere with one another, it is necessary to maintain information as to the location of each vehicle and indicate to the vehicles whether they should stop or are free to go. For example, with reference to the vehicles 104 and 106, it can be seen that these vehicles are moving toward one another as indicated by the solid arrows adjacent the vehicles in FIG. 4. Traffic controller 32, 38 therefore sends to vehicle 104 an indication that it is blocked and should stop its movement at the PIT 110 it has currently read. Meanwhile, vehicle 106 can proceed past the common intersection and on to its destination. The traffic controller maintains a "blocking table" with a designation for each of the PITs indicating whether a vehicle is controlling that PIT. The PIT 110 directly in front of vehicle 106 is indicated as being "blocked" since it is under the control of vehicle 106 and no other vehicle can approach that PIT. Once vehicle 106 has moved past this PIT 110, this PIT becomes unblocked and vehicle 104 can proceed once again. Similarly, vehicle 102 will be stopped at its next PIT 110 since the next successive PIT 110 for vehicle 102 is blocked by vehicle 104.

It is very important that information be transmitted between the traffic control 32, 38 and the vehicles in a timely manner as each vehicle approaches its next PIT 110 so that a blocking signal can be transmitted to each vehicle if the next successive PIT 110 for that vehicle is already blocked.

According to the present invention each vehicle is designated as being in transit, expected, late, or missing depending on when the last communication with the vehicle was made and the expected time of arrival of that vehicle at its next PIT 110. With reference to FIG.

5, it can be seen that when a vehicle, for example, vehicle 102, is from 10 seconds to 2 seconds to its next expected PIT 110, the vehicle is determined to be in transit. This 8 second interval 200 is calculated by the traffic control computer 32, 38 based on the known distance to a PIT and the known speed of travel of the vehicle 102 In this 8 second interval, vehicle 102 is polled in a slow polling mode. When the vehicle is in region 202, it is 2 seconds from the next expected PIT 110 and is designated as being expected. During this interval 202, the vehicle is polled in a fast polling mode. If the vehicle 102 has been polled but no response has been received during interval 202, the vehicle is designated as late for the three second interval 204 just past PIT 110. During interval 204, vehicle 102 is also polled in the fast mode. If no answer is received during interval 204, vehicle 102 is designated as missing in interval 206 and is again polled in a slow mode.

Figure 5:
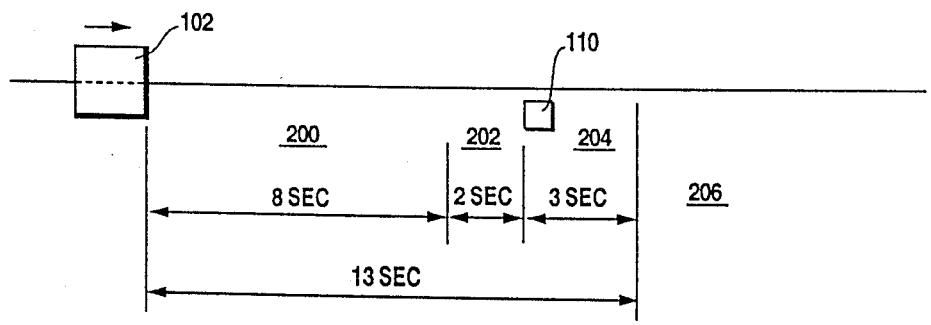
FIG. 5 is a diagram showing the position of a vehicle relative to its next position indicator for determining fast polling verses slow polling.
Figure 6:
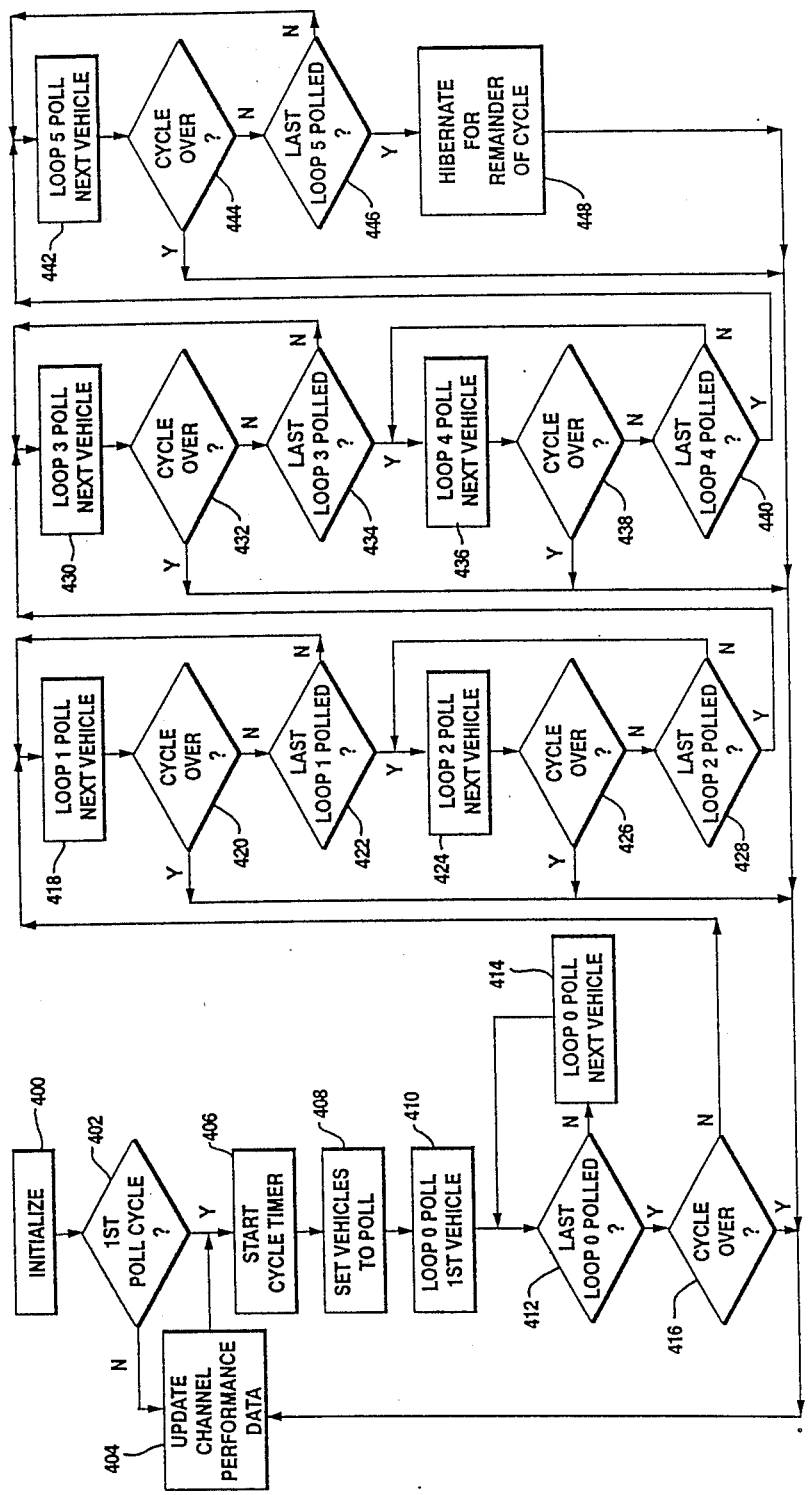
FIG. 6 is a flow chart showing the polling routine used in the present invention.

FIG. 6 shows a block diagram for the polling routine carried out by the present invention. Based on this polling routine, the data elements "loaded", "status", "lowbat", "currmp", "nextmp", "blocker" and "blockt" are determined. Also during the polling sequence, each vehicle is also given a new destination if needed and blocked or released from its block based on the blocking table. The protocol for communicating with the vehicles using the polling routine of FIG. 5 is set forth below and uses the following designations:

| Designation | Meaning |
|---|---|
| SOH | Start of Header |
| STX | Start of Text |
| ETX | End of Text |
| NAK | Negative Acknowledgement |
| ACK | Acknowledgement |
| ENQ | Enquire |
| SUB | Submit |
| EM | Error Message |
| V | Vehicle Number |
| C1 | First 6 bits of current indicator |
| C2 | Last 6 bits of current indicator |
| N1 | First 6 bits of next indicator |
| N2 | Last 6 bits of next indicator |
| D1 | First 6 bits of destination |
| D2 | Last 6 bits of destination |
| CHK | Error check character |
| S1 | Status Word one |
| S2 | Status Word two |
| E1 | Error 1 |
| E2 | Error 2 |
| E3 | Error 3 |
| E4 | Error 4 |

The status work S1 has 7 bits indicating the following:

| Bit Number | Meaning |
|---|---|
| 1 | AGV Destination Needed |
| 2 | AGV is fully charged |
| 3 | AGV is one indicator before destination |
| 4 | AGV has low battery |
| 5 | AGV has an error |
| 6 | AGV is loaded |
| 7 | AGV destination entered manually |

Status word S2 has 7 bits indicating the following:

| Bit Number | Meaning |
|---|---|
| 1-6 | not used |
| 7 | drive motor not engaged |

The communication protocol is as follows:

| Traffic Controller to Vehicle Controller | |
|---|---|
| Position Poll | SOH V |
| Poll For Destination Change | ENQ V |
| Poll Sending New Destination | SUB V D1 D2 CHK |
| Poll For Error Message | EM V |
| Block | NAK |
| Release Block | ACK |

| Vehicle Controller to Traffic Controller | |
|---|---|
| Position Poll Response | STX V C1 C2 N1 N2 S1 S2 CHK ETX |
| Destination Change Response | STX V D1 D2 CHK ETX |
| Vehicle Controller Error Message Response | STX V E1 E2 E3 E4 CHK ETX |

The polling routine will now be described with reference to FIG. 6. It should be understood that this program is run at predetermined time intervals. It has been found that the program should be run approximately every one half second. At step 400, the program is entered and all of the parameters requiring initialization are initialized. At step 402, a determination is made as to whether this is the first polling cycle since the most recent start up of the guided vehicle system. If not, control passes to block 404 where channel performance data is updated. This data is statistical data indicating the number of attempts to communicate with vehicles and the number of successful communications made for each of the communication channels. In the preferred embodiment as shown, there are two channels; one for the odd numbered AGVs and one for the even numbered AGVs (FIG. 2). This statistical information is useful to determine whether one of the communication channels is malfunctioning.

After block 404, if this is not the first poll cycle, or after block 402, if this is the first poll cycle, control passes to block 406 where the cycle timer is started. The polling cycle has a predetermined length such as 0.5 sec. When the cycle timer indicates 0.5 sec. has elapsed, the cycle is over. As will be discussed in greater detail below, when the cycle is over, the polling is discontinued and a new cycle is started.

From block 406, control passes to block 408 where the vehicles are set to poll. At this point, the system determines how many vehicles are on line to be polled with each channel. Each vehicle is assigned a unique vehicle number. The system therefore determines the numbers of the vehicles which are or line and should be polled. Control then enters the polling loops. As discussed above, the vehicles are classified according to their distance from their next PIT. That is, based on a known predetermined vehicle speed and the known time at which a vehicle passed the last PIT, and based on whether or not each vehicle responded to its last poll, the vehicles are classified either as in transit, expected, late or missing. The various polling loops address the vehicles on this basis so that the vehicles are polled and information is passed to the vehicles in a predetermined priority. As the vehicles are polled, the information obtained may change the vehicle status. This change in status is stored so that the vehicle may be polled in a different loop during the next polling cycle.

After block 408, the system enters the Loop 0 polling routine. This is a polling loop in which all of the expected and late vehicles are polled using the Position Poll, set forth above. In response to a Position Poll, a Position Poll Response is expected from the polled vehicle. After such a response is received, a Block or Release Block is transmitted based on the indicated next PIT in the Position Poll Response and the information currently stored in the blocking table indicating whether the next PIT for that machine is occupied or not. No response from the vehicle is necessary to a Block or Release Block command.

Based on the vehicle response to the Position Poll, or lack thereof, the vehicle may be indicated as late or missing, or as having a status indicated by status word S in the returned message. The relevant information is updated with regard to that vehicle for use in determining the poll Loop to be used for that vehicle in the next polling cycle.

Block 412 is the first block of Loop 0. Here, the first vehicle indicated as expected or late is polled as discussed above. The vehicles in these categories are polled in accordance with vehicle number, but some other orderly scheme may be used. After the first vehicle is polled, control passes to block 412 where it is determined if the last vehicle to be polled in Loop 0 has been polled. If the answer is 10, control passes to block 414 where the next vehicle is polled. Control then returns to block 412 where the question is again posed. This loop repeats until all Loop 0 vehicles are polled. Control then passes to block 416 where it is determined whether the polling cycle is over by reference to the cycle timer. If the cycle is over, control passes to block 404 where the channel performance statistics are recorded and a new cycle is started by returning control to block 406.

It will be noted that the polling of all Loop 0 vehicles is completed before a new cycle can be started. Loop 0 vehicles are considered to be the most important vehicles since they are the closest to their next PIT and need blocking information to ensure that a collision does not occur. The remainder of the polling loops are entered and completed only if there is time left in the polling cycle after completion of the Loop 0 poll.

If the polling cycle is not over at block 416, the Loop 1 poll sequence is entered. The Loop 1 poll sequence sends new destination information to vehicles having indicated a requirement for such information. It will be remembered that the Position Poll Response status word S has a bit indicating whether a new destination is needed. The system accesses all of the vehicles in which this bit was set in the last polling cycle in order of vehicle number and transmits a Poll Sending New Destination. No response to this poll is required.

In block 418, the next vehicle, by vehicle number, is polled with a Poll Sending New Destination. Control then passes to block 420 where it is determined whether the cycle is over. If the cycle is over, control passes to block 404 where the channel statistics are recorded and a new cycle is started. If the cycle is not over, control passes to block 424 where it is determined whether all of the Loop 1 vehicles have been polled. If not, control passes to block 418 where the next vehicle is polled. It will be noted that all of the Loop 1 vehicles may not have been polled when the cycle is over at block 420. Thus, on the next polling cycle, the Loop 1 polling sequence will start with the vehicle where it left off after termination of the current polling cycle.

If the Loop 1 polling sequence is completed as indicated in block 428 and the current cycle is not over, as indicated in block 426, control passes to the Loop 2 polling sequence. In the Loop 2 sequence, frozen and freed vehicles are polled. When a vehicle reaches a waste or reject dumper or other equipment performing a function requiring the vehicle to be inactive for a predetermined time while another activity is carried on by such other equipment, the vehicle is referred to as being "frozen." In this case, a Block command is sent to the vehicle. The vehicle is now frozen. The reason for the Block is stored in memory under the entry Blocker so that the system knows that this is a frozen vehicle. After the predetermined amount of time, a Release Block poll is sent to the vehicle to cause the vehicle to become freed. In Loop 2, vehicles which were frozen previously or freed in the last cycle are polled using the Position Poll. A Position Poll Response message is sent by the polled vehicle and traffic controller sends a Block poll to those vehicles which are to remain frozen and a Release Block to those vehicles which are to be freed.

In block 424, the next Loop 2 vehicle is polled. As with the Loop 1 polling, the next vehicle is determined based on where the polling left off in the last polling cycle if all of the Loop 2 vehicles were not polled last time. Control then passes to block 426 :;here a determination is made as to whether the cycle is over. If the cycle is over, control passes to block 404 and a new cycle is then begun. If the cycle is not over, control passes to block 428 where a determination is made as to whether all of the Loop 2 vehicles have been polled. If not, control returns to block 424 where the next Loop 2 vehicle is rolled.

After all of the Loop 2 vehicles are polled, control passes to Loop 3 where the missing and in transit vehicles are polled. These vehicles are polled using the Position Poll to which a Position Poll Response is sent by the polled vehicle. The controller then sends a Block or Release Block poll to the polled vehicle as appropriate.

The sequence in Loop 3 is the same as in the other Loops. The next vehicle is polled in block 430, a determination is made in block 432 as to whether the cycle is over, and a determination is made in block 434 as to whether the last Loop 3 vehicle has been polled. If the cycle is not over and all Loop 3 vehicles have been polled, control passes to Loop 4.

In Loop 4, vehicles sent a new destination in a previous cycle are polled using a Poll For Destination Change. Each polled vehicle returns a Destination Change Response according to which the controller determines if the proper new destination was received by the vehicle. If the proper destination was not received by a vehicle, that vehicle is sent a new destination poll again during the next Loop 1 poll. Each vehicle receiving a new destination is polled during Loop 4 until the response received indicates that the proper new destination was received.

The sequence in Loop 4 is the same as in the previous Loops. The next vehicle is polled in block 436, the end of the cycle is determined in block 438, and the polling of the last Loop 4 vehicle is determined in block 440. If the cycle has not ended and all Loop 4 vehicles have not been polled, control returns to block 436. If the cycle has ended, control returns to block 404. If the cycle has not ended and all Loop 4 vehicles have been polled, control passes to Loop 5.

The Position Poll Response contains a status word S which has one bit, bit 5, which is set if there is an error on the vehicle polled. In Loop 5, all vehicles in which this bit was set in a previous cycle are rolled with a Poll For Error Message. The polled vehicle responds with an Error Message Response containing four words E1, E2, E3, and E4 which are used to communicate the exact nature of the error on the vehicle.

The sequence in Loop 5 is the same as in the prior Loops. The next vehicle is polled at block 442, the end of the cycle is determined at block 444 and the polling of all Loop 5 vehicles is determined at block 446. If the cycle ends during Loop 5, control passes to block 404. If all of the Loop 5 vehicles have not been polled and the cycle has not ended, control returns to block 442. If all of the Loop 5 vehicles have been polled and the cycle has not ended, control passes to block 448 where the system hibernates until the end of the cycle at which time control passes to block 404.

The foregoing explanation is set forth for the purpose of illustrating the invention but is not considered to limit the scope thereof. Clearly, numerous additions, substitutions and other modification can be made without departing from the scope of the invention, as set forth in the appended claims.

What is claimed is:

1. A system, comprising:
 a guided vehicle path;
 a plurality of guided vehicles operating along said path;
 a plurality of indicators positioned along said path for indicating to said vehicles position on said path; and
 a guided vehicle controller, comprising:
  means for communicating with said guided vehicles;
  a first computer system for exchanging information with said guided vehicles through said communicating means, said first computer system including a first memory section for storing information received from said vehicles including vehicle position information of each vehicle in relation to said indicators and including a second memory section for storing information to be transmitted to said vehicles including vehicle destination information;
  a second computer system for receiving vehicle movement requests from external sources and determining which vehicles are to respond to said requests, said second computer system including a third memory section for storing information relating to vehicle position in relation to said indicators and including a fourth memory section for storing information including vehicle destination information;
  first transfer means for copying said information in said first memory section to said third memory section so that said first memory section and said third memory section contain the same vehicle position information; and
  second transfer means for copying said information in said fourth memory section to said second memory section so that said fourth memory section and said second memory section contain the same vehicle destination information.

2. A system as claimed in claim 1 wherein said first transfer means includes an intermediate memory for temporarily storing said vehicle position information.

3. A system as claimed in claim 1 wherein said second transfer means includes an intermediate memory for temporarily storing said vehicle destination information.

4. A system as claimed in claim 1 wherein said guided vehicle controller further includes a third computer system for backing up said first computer system, said third computer system having a fifth memory section for storing said vehicle position information and a sixth memory section for storing said vehicle destination information, and a fourth computer system for backing up said second computer system, said fourth computer system having a seventh memory section for storing said vehicle position information and an eight memory section for storing said vehicle destination information and said first transfer means includes means for copying said vehicle position information to said fifth memory section and to said seventh memory section, and said second transfer means includes means for copying said vehicle destination information to said sixth memory section and to said eighth memory section.

5. A system as claimed in claim 1 wherein said vehicle position information for each vehicle includes the last position indicator passed by the vehicle and the next position indicator to be reached by the vehicle.

6. A system as claimed in claim 1 wherein said first computer system includes means for determining the expected travel time of each vehicle to an upcoming position indicator and said first computer system stores information indicative of said expected travel time in said first memory section.

7. A system as claimed in claim 6 wherein said first transfer means copies said expected travel time information from said first memory section to said third memory section.

8. A system as claimed in claim 1 wherein said communicating means comprises a radio communications link between said first computer system and each vehicle.

9. A system, comprising:
 a guided vehicle path;
 a plurality of guided vehicles operating along said path;
 a plurality of indicators positioned along said path for indicating to said vehicles position on said path; and
 a guided vehicle controller, comprising:
  means for communicating with said guided vehicles;
  a first computer system for exchanging information with said guided vehicles through said communicating means, said first computer system including a first memory section for storing information received from said vehicles including vehicle position information of each vehicle in relation to said indicators and including a second memory section for storing information to be transmitted to said vehicles including vehicle destination information;
  a second computer system for receiving vehicle movement requests from external sources and determining which vehicles are to respond to said requests, said second computer system including a third memory section for storing information relating to vehicle position in relation to said indicators and including a fourth memory section for storing information including vehicle destination information;

first transfer means for copying said information in said first memory section to said third memory section so that said first memory section and said third memory section contain the same vehicle position information; and second transfer means for copying said information in said fourth memory section to said second memory section so that said fourth memory section and said second memory section contain the same vehicle destination information;

wherein said first computer system polls said vehicles using a fast polling routine for vehicles within a first predetermined distance of a next position indicator and using a slow polling routine after the fast polling routine is completed, and wherein said fast polling routine includes requesting information from each vehicle as to its position, storing said requested fast polling position information in said first memory section and indicating to each fast polled vehicle whether it should stop or continue 10. A system as claimed in claim 9 wherein said slow polling routine comprises sending new destination information to each vehicle requiring a new destination, and requesting of vehicles not polled during said fast polling routine information relating to vehicle position, storing said requesting slow poll vehicle position information in said first memory section, indicating to said slow polled vehicles whether they should stop or continue and requesting error information from all vehicles.

11. A system as claimed in claim 9 wherein said fast polling routine is begun at predetermined time intervals and said slow polling routine is begun only after said fast polling routine is completed, and wherein said first computer system designates a cycle time and terminates said slow polling routine when said cycle time has ended, stores information relating to the termination of said slow polling routine in said first memory section and continues the slow polling routine when a subsequent fast polling routine is indicated.

12. A system, comprising:
a plurality of vehicles traveling on predetermined paths;
indicators on said paths for indicating to said vehicles the position of said vehicles along said paths;
means for communicating with each of said vehicles;
a controller for receiving position information from said vehicles through said communicating means and for transmitting control information to said vehicles through said communicating means, said controller including means for prioritizing said vehicles based on an expected distance to said indicators such that vehicles expected to be within a first predetermined distance of one of said indicators are given a high priority and vehicles expected to be within a second predetermined distance to one of said indicators are given a low priority, said control information including a first type of information to be sent to said vehicles and a second type of information to be sent to said vehicles, and means for polling said vehicles first in a high priority sequence and then in a low priority sequence such that, during said high priority sequence, said high priority vehicles are polled to obtain position information from each polled vehicle and said first type of information is transmitted to each polled vehicle, and such that, during said low priority sequence, low priority vehicles are polled to obtain position information and said first type of information is transmitted to said low priority vehicles and said second type of information is transmitted to said high priority vehicles and to said low priority vehicles.

13. A system as claimed in claim 12 wherein said controller establishes a polling cycle having a predetermined time, and wherein said polling means polls all of said high priority vehicles regardless of said polling cycle but terminates said polling of said low priority vehicles when said predetermined time has expired.

14. A system as claimed in claim 13 wherein said polling cycle is repetitive and said polling means polls all high priority vehicles during each repetition of said polling cycle and polls low priority vehicles only after all of said high priority vehicles have been polled and said predetermined time has not expired.

15. A system as claimed in claim 12 wherein, during said low priority sequence, said polling means first transmits said second type of information to all vehicles requiring it, then polls said low priority vehicles to obtain position information.

16. A system as claimed in claim 15 wherein said second type of information comprises destination information.

17. A system as claimed in claim 12 wherein said first type of information comprising blocking data indicates that the polled information should stop and release blocking data indicates that the polled vehicle should continue.

18. A system as claimed in claim 12 wherein said information received from said vehicles includes a request for a new destination.

19. A system as claimed in claim 12 wherein said information received from said vehicles includes an indication of an error.

* * * * *

UNITED STATES PATENT AND TRADEMARK OFFICE
CERTIFICATE OF CORRECTION

PATENT NO. : 4,956,777
DATED : September 11, 1990
INVENTOR(S) : Thomas W. Cearley et al.

It is certified that error appears in the above—identified patent and that said Letters Patent is hereby corrected as shown below:

ON THE TITLE PAGE
[75] Inventors: Aftab Shamb, should be --Aftab Shams--.
Add the names of Michael L. Strzyzewski and Benjamin F. Thomas Col. 3, line 46, "FIG." should be --FIG. 1--.
Col. 3, line 55, delete ",".
Col. 4, line 24, "system" should be --system 10--.
Col. 5, line 1, "pDp" should be --PDP--.
Col. 5, line 62, "36,," should be --36',--.
Col. 6, line 40, "CI:ISP" should be --CRISP--.
Col. 6, line 56, insert "data" after contains.
Col. 10, line 60, "or" should be --on--.
Col. 11, line 33, "10" should be --NO--.
Col. 12, line 33, ":;here" should be --where--.

UNITED STATES PATENT AND TRADEMARK OFFICE
CERTIFICATE OF CORRECTION

PATENT NO. : 4,956,777

DATED : September 11, 1990

INVENTOR(S) : Thomas W. Cearley et al.

It is certified that error appears in the above-identified patent and that said Letters Patent is hereby corrected as shown below:

Col. 12, line 40, "rolled" should be --polled--.

Signed and Sealed this

Seventh Day of April, 1992

*Attest:*

HARRY F. MANBECK, JR.

*Attesting Officer*  *Commissioner of Patents and Trademarks*